US009605633B2

(12) United States Patent
Devani et al.

(10) Patent No.: US 9,605,633 B2
(45) Date of Patent: Mar. 28, 2017

(54) MANIFOLD ASSEMBLY FOR DUAL-WALLED PIPE

(71) Applicant: Electro-Motive Diesel, Inc., LaGrange, IL (US)

(72) Inventors: Farhan F. Devani, Morton Grove, IL (US); Jeffrey P. Nowak, Munster, IN (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 330 days.

(21) Appl. No.: 14/265,599

(22) Filed: Apr. 30, 2014

(65) Prior Publication Data

US 2015/0316190 A1    Nov. 5, 2015

(51) Int. Cl.
  *F16L 55/00*  (2006.01)
  *F02M 37/00*  (2006.01)
  *F16L 23/00*  (2006.01)
  *F16L 39/00*  (2006.01)
  *F02M 21/02*  (2006.01)
  *F17D 5/02*  (2006.01)
  *F16L 41/00*  (2006.01)
  *G01M 3/28*  (2006.01)

(52) U.S. Cl.
  CPC ........ *F02M 37/00* (2013.01); *F02M 21/0218* (2013.01); *F02M 37/0017* (2013.01); *F16L 23/003* (2013.01); *F16L 39/00* (2013.01); *F16L 39/005* (2013.01); *F16L 41/008* (2013.01); *F16L 55/00* (2013.01); *F17D 5/02* (2013.01); *G01M 3/283* (2013.01); *F16L 2201/30* (2013.01); *Y02T 10/32* (2013.01)

(58) Field of Classification Search
  CPC ............... F02M 37/00; F02M 37/0017; F02M 21/0218; F16L 41/008; F16L 39/005; F16L 39/00; F16L 23/003; F16L 55/00; F16L 2201/30; G01M 3/00; F17D 5/02
  USPC ......... 285/93, 123.1, 123.12, 123.15, 123.16
  See application file for complete search history.

(56) References Cited

U.S. PATENT DOCUMENTS

| 1,389,768 | A |   | 9/1921  | McFarland |                        |
|-----------|---|---|---------|-----------|------------------------|
| 2,817,230 | A | * | 12/1957 | McCully   | ............ G01M 3/2861 |
|           |   |   |         |           | 374/143                |
| 4,232,736 | A | * | 11/1980 | Pillette  | .................... E21B 33/03 |
|           |   |   |         |           | 137/312                |
| 4,466,273 | A | * | 8/1984  | Pillette  | .................... E21B 33/03 |
|           |   |   |         |           | 73/40.5 R              |

(Continued)

FOREIGN PATENT DOCUMENTS

EP    2589787 A1    8/2013

*Primary Examiner* — Basil Katcheves
*Assistant Examiner* — Joshua Ihezie
(74) *Attorney, Agent, or Firm* — Miller, Matthias & Hull

(57) ABSTRACT

A manifold for a dual-walled pipe includes a body, a primary conduit extending through the body and fluidly communicating with a primary passage of the dual-walled pipe, and a first socket having an outboard aperture and an inboard aperture fluidly communicating with the primary conduit. An intermediate chamber is disposed between the outboard aperture and the inboard aperture, and a first leakage conduit is formed in the body with a first end fluidly communicating with the intermediate chamber of the first socket and a second end adapted to fluidly communicate with a secondary passage of the pipe.

19 Claims, 2 Drawing Sheets

(56) References Cited

U.S. PATENT DOCUMENTS

| | | | | |
|---|---|---|---|---|
| 4,723,441 | A * | 2/1988 | Sweeney | F17D 5/04 |
| | | | | 73/40.5 R |
| 5,222,769 | A * | 6/1993 | Kaempen | B29C 70/207 |
| | | | | 138/128 |
| 6,446,661 | B2 * | 9/2002 | Armenia | F16L 11/20 |
| | | | | 137/312 |
| 6,446,671 | B2 * | 9/2002 | Armenia | F16L 11/20 |
| | | | | 138/109 |
| 6,848,720 | B2 * | 2/2005 | Carns | F16L 39/005 |
| | | | | 285/123.15 |
| 6,986,622 | B2 | 1/2006 | Ageheim et al. | |
| 7,316,154 | B1 | 1/2008 | Bennett | |
| 8,701,467 | B2 * | 4/2014 | Carns | F16L 23/003 |
| | | | | 285/123.1 |
| 9,279,532 | B2 * | 3/2016 | McAtarian | F16L 55/07 |
| 2004/0026922 | A1 * | 2/2004 | Carns | F16L 39/005 |
| | | | | 285/123.15 |
| 2010/0288018 | A1 * | 11/2010 | Hopmann | F02M 55/002 |
| | | | | 73/40.5 R |
| 2011/0154886 | A1 * | 6/2011 | Carns | F16L 23/003 |
| | | | | 73/46 |
| 2013/0000747 | A1 | 1/2013 | Buresi et al. | |
| 2013/0160886 | A1 * | 6/2013 | Wright, Jr. | F16L 55/16 |
| | | | | 138/97 |
| 2014/0097611 | A1 * | 4/2014 | Webb | F16L 23/003 |
| | | | | 285/13 |
| 2014/0283788 | A1 * | 9/2014 | Bleyer | F02D 41/22 |
| | | | | 123/445 |

* cited by examiner

MANIFOLD ASSEMBLY FOR DUAL-WALLED PIPE

TECHNICAL FIELD

The present disclosure generally relates to fittings for dual-walled pipes, and more particularly to manifolds and manifold assemblies for dual-walled pipes used to convey fuel or other hazardous fluids.

BACKGROUND

Dual-walled or coaxial pipe systems are used to convey fluid from one location to another. Dual-walled pipes include an inner pipe disposed within and an outer pipe. In one example, fluid may be conveyed through the inner pipe while the outer pipe contains any fluid that escapes from the inner pipe. While dual-walled pipe systems may be used to convey many types of fluid, they are particularly useful for conveying fuels, hazardous liquids, toxic gases, etc. Dual-walled pipes are available in a variety of different sizes, and may convey two fluids, such as a first fluid through the inner pipe and a second fluid through the annulus between the inner and outer pipes.

When used as a natural gas supply line, dual-walled pipe systems may prevent leakage of natural gas into the atmosphere in case of damage to the inner pipe, a seal, or a weld. The outer pipe may contain the gas leaking from the inner pipe. However, the inner and outer pipes may be connected to various end fittings or flanges that connect the inner and outer pipes to a crankcase or other device.

In dual-walled pipe systems, it may be desirable to provide access points to the primary passage inside the inner pipe for sensors or other components. Typical sensors may include temperature, pressure, or other types of sensors used to provide feedback regarding one or more parameters of the fluid. The insertion of sensors through the outer and inner pipes, however, creates a potential fluid leakage path. As such, sensors or other components requiring direct access to the primary passage must often be located within containment rooms or structures. The need for such containment not only increases costs but limits the proximity at which the sensors may be placed relative to other system components, such as an engine. Accordingly, it would be advantageous to provide access to the primary passage for insertion of sensors or other components while still containing leaked fluid without requiring bulky or additional containment structures.

SUMMARY OF THE DISCLOSURE

In accordance with one aspect of the present disclosure, a manifold is provided for use with a dual-walled pipe having an inner pipe surrounded by an outer pipe to define a primary passage and a secondary passage. The manifold may include a body having a sidewall extending between a first flange surface and a second flange surface, a primary conduit extending through the body from the first flange surface to the second flange surface and adapted to fluidly communicate with the primary passage, and a first socket formed in the body and having an outboard aperture adjacent the sidewall and an inboard aperture fluidly communicating with the primary conduit, the first socket defining an intermediate chamber disposed between the outboard aperture and the inboard aperture. A first leakage conduit is formed in the body and has a first end fluidly communicating with the intermediate chamber of the first socket and a second end adapted to fluidly communicate with the secondary passage.

In accordance with another aspect of the present disclosure, a manifold is provided for use with a dual-walled pipe having an inner pipe surrounded by an outer pipe to define a primary passage and a secondary passage, and a sensor having a sensor body. The manifold may include a body having a sidewall extending between a first flange surface and a second flange surface and a primary conduit extending through the body from the first flange surface to the second flange surface and adapted to fluidly communicate with the primary passage. A first socket is formed in the body and has an outboard aperture adjacent the sidewall and an inboard aperture fluidly communicating with the primary conduit, the first socket defining an intermediate chamber disposed between the outboard aperture and the inboard aperture and a seat disposed between the inboard aperture and the intermediate chamber. A seal is disposed in the seat and sized to sealingly engage the sensor body, and a first leakage conduit is formed in the body and has a first end fluidly communicating with the intermediate chamber of the first socket and a second end adapted to fluidly communicate with the secondary passage.

In accordance with another aspect of the present disclosure, a manifold assembly is provided for use with a dual-walled pipe having an inner pipe surrounded by an outer pipe to define a primary passage and a secondary passage. The manifold assembly may include a manifold including a body having a sidewall extending between a first flange surface and a second flange surface, a primary conduit extending through the body from the first flange surface to the second flange surface and adapted to fluidly communicate with the primary passage, a first socket formed in the body and having an outboard aperture adjacent the sidewall and an inboard aperture fluidly communicating with the primary conduit, the first socket defining an intermediate chamber disposed between the outboard aperture and the inboard aperture and a seat disposed between the inboard aperture and the intermediate chamber, and a first leakage conduit formed in the body and having a first end fluidly communicating with the intermediate chamber of the first socket and a second end adapted to fluidly communicate with the secondary passage. The manifold assembly may further include a sensor disposed in the first socket and having a sensor body engaging the seat of the first socket, and a first cap assembly coupled to the first socket and extending over at least a portion of the outboard aperture of the first socket.

In accordance with another aspect of the present disclosure that may be combined with any of the other aspects disclosed herein, the manifold may further include a first secondary conduit extending through the body and adapted to fluidly communicate with the secondary passage, in which the second end of the first leakage conduit fluidly communicates with the first secondary conduit.

In accordance with another aspect of the present disclosure that may be combined with any of the other aspects disclosed herein, the first socket may further define a seat disposed between the inboard aperture and the intermediate chamber sized to receive a seal.

In accordance with another aspect of the present disclosure that may be combined with any of the other aspects disclosed herein, the manifold may further include a first cap assembly coupled to the first socket and extending over at least a portion of the outboard aperture of the first socket.

In accordance with another aspect of the present disclosure that may be combined with any of the other aspects disclosed herein, the first cap assembly may include a cap having a first end directly coupled to the first socket and a second end, and a plug coupled to the cap second end.

In accordance with another aspect of the present disclosure that may be combined with any of the other aspects disclosed herein, the manifold may further include a second socket formed in the body and having an outboard aperture adjacent the sidewall and an inboard aperture fluidly communicating with the primary conduit, the second socket defining an intermediate chamber disposed between the outboard aperture and the inboard aperture, and a second leakage conduit formed in the body and having a first end fluidly communicating with the intermediate chamber of the second socket and a second end adapted to fluidly communicate with the secondary passage.

In accordance with another aspect of the present disclosure that may be combined with any of the other aspects disclosed herein, the manifold may further include a second secondary conduit extending through the body and adapted to fluidly communicate with the secondary passage, in which the second end of the second leakage conduit fluidly communicates with the second secondary conduit.

In accordance with another aspect of the present disclosure that may be combined with any of the other aspects disclosed herein, the sensor may further include a sensor wire extending from a rearward end of the sensor, and the first cap assembly includes a cap having a first end directly coupled to the first socket and a second end, and a plug coupled to the cap second end and having a plug wall defining a wire aperture sized to sealingly engage the sensor wire.

In accordance with another aspect of the present disclosure that may be combined with any of the other aspects disclosed herein, the first socket may further include an inboard section having a first diameter sized to receive a forward end of the sensor, an outboard section having a second diameter larger than the first diameter, and a shoulder disposed between the inboard section and the outboard section, and in which the first end of the first leakage conduit extends through the shoulder.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Embodiments of manifolds and manifold assemblies are disclosed for use with dual-walled pipes that permit access to a primary passage while preventing leakage of fluid flowing through the pipes. In the exemplary embodiments described herein, the primary passage defined by an inner pipe is used to transport fuel or other fluid while a secondary passage defined by an outer pipe surrounds the inner pipe and is used to contain and/or detect leakage from the primary passage. The secondary passage may be placed under partial vacuum pressure so that any leaking fuel is drawn to a desired monitoring point. The manifolds disclosed herein include sockets that provide direct fluid communication with the primary passage and therefore may be used by sensors to provide feedback regarding the fluid flow through the primary passage. An intermediate chamber formed in the socket, which may be located outboard of a seal between the sensor and the socket, may communicate with the secondary passage such as through leakage conduits formed in the manifold. The partial vacuum pressure present in the secondary passage, therefore, will draw leaked fluid reaching the intermediate chamber into the secondary passage to prevent release into the surrounding environment.

Figure 1:
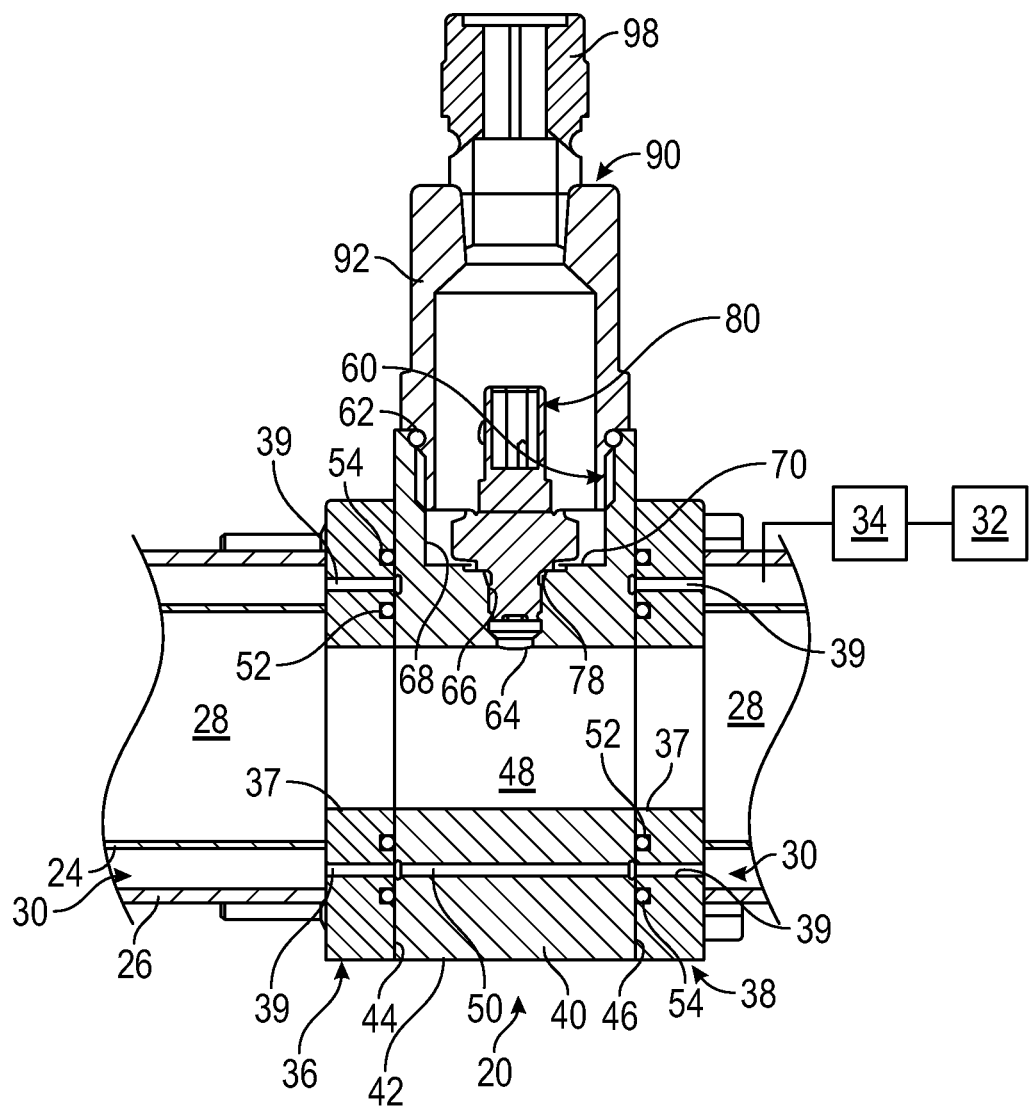
FIG. 1 is a front elevation view, in cross-section, of a manifold assembly disposed in a dual-walled pipe in accordance with an aspect of the disclosure.

Turning to FIG. 1, an exemplary manifold 20 is shown disposed in a dual-walled pipe 22. The dual-walled pipe 22 may include an inner pipe 24 surrounded by an outer pipe 26. The inner pipe 24 defines a primary passage 28 through which a primary fluid, such as fuel, may flow. The annular space between the inner and outer pipes 24, 26 defines a secondary passage 30 that may be used to contain fluid leaking from the primary passage 28. The secondary passage 30 may fluidly communicate with a vacuum source 32 that places the secondary passage 30 under partial vacuum pressure, thereby to direct any leaked fluid to a collection point such as a leakage detection unit 34. The dual-walled pipe 22 may further include first and second flanges 36, 38 configured to sealingly engage opposite sides of the manifold 20. Each of the first and second flanges 36, 38 may include a primary port 37 fluidly communicating with the primary passage 28 and multiple secondary ports 39 fluidly communicating with the secondary passage 30.

The manifold 20 may be located at a desired point along the dual-walled pipe 22. As seen with reference to FIGS. 1 and 2, the manifold 20 includes a body 40 having a sidewall 42 extending between a first flange surface 44 and a second flange surface 46. The first and second flange surfaces 44, 46 may be configured to closely fit against the first and second flange 36, 38, respectively. A primary conduit 48 may extend through the body 40 from the first flange surface 44 to the second flange surface 46 and may be adapted to fluidly communicate with the primary passage 28, such as via the primary port 37 of the first and second flanges 36, 38. A plurality of secondary conduits 50 may also extend through the body 40 from the first flange surface 44 to the second flange surface 46 and may be adapted to fluidly communicate with the secondary passage 30, such as via the secondary ports 39 of the first and second flanges 36, 38. Inner and outer seals 52, 54 may be positioned on opposite sides of the secondary conduits 50 at both the first and second flange surfaces 44, 46 to prevent fluid leakage between the manifold 20 and the first and second flanges 36, 38. Accordingly, while the manifold 20 extends through the dual-walled pipe 22, it permits uninterrupted fluid flow through the primary and secondary passages 28, 30.

Figure 2:
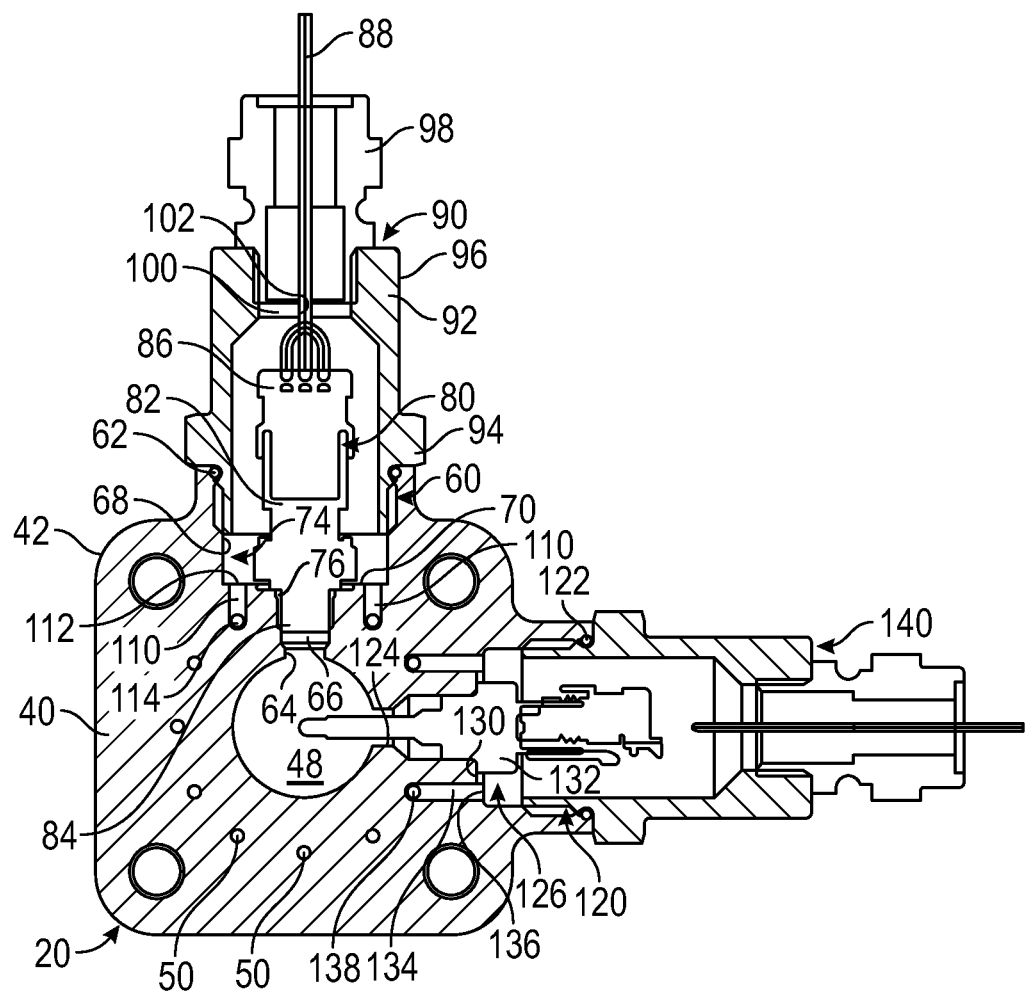
FIG. 2 is a side elevation view, in cross-section, of the manifold assembly of FIG. 1.

The manifold 20 provides one or more direct access points that fluidly communicate with the primary passage 28. As best shown in FIGS. 1 and 2, a first socket 60 is formed in the body 40 extending between an outboard aperture 62 located adjacent the sidewall 42 and an inboard aperture 64 fluidly communicating with the primary conduit 48. The first socket 60 may have an inboard section 66 located nearer the inboard aperture 64 and having a first diameter, and an outboard section 68 located nearer the outboard aperture 62 and having a second diameter. The first diameter may be smaller than the second diameter to form a shoulder 70 disposed between the inboard section 66 and the outboard section 68. The first socket 60 may further define an intermediate chamber 74 disposed between the inboard aperture 64 and the outboard aperture 62 that may include at least a portion of the outboard section 68. Additionally, the first socket 60 may define a seat 76 disposed between the inboard aperture 64 and the intermediate chamber 74 sized to receive a seal, such as an O-ring 78.

In the illustrated embodiments, the first socket 60 is configured to receive a sensor 80. The sensor 80 may include a sensor body 82 having a forward end 84 sized for insertion into the inboard section 66 and a rearward end 86 disposed in the outboard section 68. The body 40 may be sized to sealingly engage the O-ring 78, thereby to prevent fluid from leaking between the sensor 80 and the first socket 60 and into the intermediate chamber 74. The sensor 80 may further include a sensor wire 88 extending distally from the rearward end 86 and out of the first socket 60. The sensor 80 may be configured to determine a parameter of the fluid flow, such as temperature or pressure, and communicate feedback regarding that parameter to a controller (not shown).

A cap assembly 90 may be coupled to the socket to at least partially enclose the sensor 80 within the first socket 60. As illustrated, the cap assembly 90 may include a cap 92 having a first end 94 directly coupled, such as by threaded engagement, to the first socket 60, and a second end 96. A plug 98 may be coupled to the cap second end 96 and may include a plug wall 100 defining a wire aperture 102 sized to sealingly engage the sensor wire 88, thereby to substantially enclose the intermediate chamber 74. While the cap 92 and plug 98 may be configured to form an airtight enclosure across the outboard aperture 62, such a seal is not necessary.

The manifold 20 may be configured to contain and direct into the secondary passage 30 and fluid that may leak from the primary passage 28 between the sensor 80 and first socket 60 and into the intermediate chamber 74. More specifically, as best shown in FIG. 2, one or more leakage conduits 110 may be formed in the body 40 that fluidly communicate between the intermediate chamber 74 and the secondary passage 30. In the illustrated embodiments, for example, the leakage conduits 110 may have a first end 112 extending through the shoulder 70 to fluidly communicate with the intermediate chamber 74 and a second end 114 fluidly communicating with one of the secondary conduits 50. As noted above, the secondary conduit 50, in turn, fluidly communicates with the secondary passage 30. While two leakage conduits 110 are shown in the embodiment illustrated in FIG. 2, it will be appreciated that a single leakage conduit 110 or more than two leakage conduits 110 may be used.

The manifold 20 may further be capable of interfacing with additional sensors. As best shown in FIG. 2, for example, the manifold 20 may include a second socket 120 similar to the first socket 60. Accordingly, the second socket 120 may be formed in the body 40 and have an outboard aperture 122 adjacent the sidewall 42 and an inboard aperture 124 fluidly communicating with the primary conduit 48. The second socket 120 may further define an intermediate chamber 126 disposed between the outboard aperture 122 and the inboard aperture 124 and a seat 128 disposed between the inboard aperture 124 and the intermediate chamber 126. A seal, such as O-ring 130, may be disposed in the seat 128 and sized to sealingly engage a second sensor 132 inserted into the second socket 120. A second leakage conduit 134 may have a first end 136 fluidly communicating with the intermediate chamber 126 and a second end 138 fluidly communicating with the secondary passage 30. In the illustrated embodiment, the second end 138 of the second leakage conduit 134 may fluidly communicate with one of the secondary conduits 50. A second cap assembly 140 may be coupled to the second socket 120 and extend over at least a portion of the outboard aperture 122 of the second socket 120.

INDUSTRIAL APPLICABILITY

Embodiments of a manifold 20 are disclosed which permit direct access to the primary passage 28 of a dual-walled pipe 22 while containing fluid leakage from the primary passage 28 and directing it to the secondary passage 30. The manifold 20 may include a first socket 60 that defines an intermediate chamber 74 positioned along the leak path that fluidly communicates with the secondary passage 30 via the leakage conduit 110. When the secondary passage 30 is placed under partial vacuum pressure by the vacuum source 32, fluid reaching the intermediate chamber 74 is pulled through the leakage conduit 110 and into the secondary passage 30 to prevent escape into the surrounding environment. The manifold 20 may include the second socket 120 or further sockets to accommodate additional sensors. Each further socket may define an intermediate chamber 126 and associated leakage conduit 110 to prevent escape of fluids out of the manifold. Accordingly, the manifold 20 permits access to the primary passage 28 while maintaining the integrity of the dual-walled pipe system.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A manifold for use with a dual-walled pipe having an inner pipe surrounded by an outer pipe to define a primary passage and a secondary passage, the manifold comprising:
   a body having a sidewall extending between a first flange surface and a second flange surface;
   a primary conduit extending through the body from the first flange surface to the second flange surface and adapted to fluidly communicate with the primary passage;
   a first socket formed in the body and having an outboard aperture adjacent the sidewall and an inboard aperture fluidly communicating with the primary conduit, the first socket defining an intermediate chamber disposed between the outboard aperture and the inboard aperture;
a first leakage conduit formed in the body and having a first end fluidly communicating with the intermediate chamber of the first socket and a second end adapted to fluidly communicate with the secondary passage; and
a first secondary conduit extending through the body and adapted to fluidly communicate with the secondary passage, in which the second end of the first leakage conduit fluidly communicates with the first secondary conduit.

2. The manifold of claim 1, in which the first socket further defines a seat disposed between the inboard aperture and the intermediate chamber sized to receive a seal.

3. The manifold of claim 1, further comprising a first cap assembly coupled to the first socket and extending over at least a portion of the outboard aperture of the first socket.

4. The manifold of claim 3, in which the first cap assembly includes a cap having a first end directly coupled to the first socket and a second end, and a plug coupled to the cap second end.

5. The manifold of claim 1, further comprising a second socket formed in the body and having an outboard aperture adjacent the sidewall and an inboard aperture fluidly communicating with the primary conduit, the second socket defining an intermediate chamber disposed between the outboard aperture and the inboard aperture; and
a second leakage conduit formed in the body and having a first end fluidly communicating with the intermediate chamber of the second socket and a second end adapted to fluidly communicate with the secondary passage.

6. The manifold of claim 5, further comprising a second secondary conduit extending through the body and adapted to fluidly communicate with the secondary passage, in which the second end of the second leakage conduit fluidly communicates with the second secondary conduit.

7. A manifold for use with a dual-walled pipe having an inner pipe surrounded by an outer pipe to define a primary passage and a secondary passage, and a sensor having a sensor body, the manifold comprising:
a body having a sidewall extending between a first flange surface and a second flange surface;
a primary conduit extending through the body from the first flange surface to the second flange surface and adapted to fluidly communicate with the primary passage;
a first socket formed in the body and having an outboard aperture adjacent the sidewall and an inboard aperture fluidly communicating with the primary conduit, the first socket defining an intermediate chamber disposed between the outboard aperture and the inboard aperture and a seat disposed between the inboard aperture and the intermediate chamber;
a seal disposed in the seat and sized to sealingly engage the sensor body; and
a first leakage conduit formed in the body and having a first end fluidly communicating with the intermediate chamber of the first socket and a second end adapted to fluidly communicate with the secondary passage.

8. The manifold of claim 7, further comprising a first secondary conduit extending through the body and adapted to fluidly communicate with the secondary passage, in which the second end of the first leakage conduit fluidly communicates with the first secondary conduit.

9. The manifold of claim 7, further comprising a first cap assembly coupled to the first socket and extending over at least a portion of the outboard aperture of the first socket.

10. The manifold of claim 9, in which:
the sensor further comprises a sensor wire extending from a rearward end of the sensor; and
the first cap assembly comprises a cap having a first end directly coupled to the first socket and a second end, and a plug coupled to the cap second end and having a plug wall defining a wire aperture sized to sealingly engage the sensor wire.

11. The manifold of claim 7, in which the first socket further includes an inboard section having a first diameter sized to receive a forward end of the sensor, an outboard section having a second diameter larger than the first diameter, and a shoulder disposed between the inboard section and the outboard section, and in which the first end of the first leakage conduit extends through the shoulder.

12. A manifold assembly for use with a dual-walled pipe having an inner pipe surrounded by an outer pipe to define a primary passage and a secondary passage, the manifold assembly comprising:
a manifold including:
a body having a sidewall extending between a first flange surface and a second flange surface;
a primary conduit extending through the body from the first flange surface to the second flange surface and adapted to fluidly communicate with the primary passage;
a first socket formed in the body and having an outboard aperture adjacent the sidewall and an inboard aperture fluidly communicating with the primary conduit, the first socket defining an intermediate chamber disposed between the outboard aperture and the inboard aperture and a seat disposed between the inboard aperture and the intermediate chamber; and
a first leakage conduit formed in the body and having a first end fluidly communicating with the intermediate chamber of the first socket and a second end adapted to fluidly communicate with the secondary passage;
a sensor disposed in the first socket and having a sensor body engaging the seat of the first socket; and
a first cap assembly coupled to the first socket and extending over at least a portion of the outboard aperture of the first socket.

13. The manifold assembly of claim 12, further comprising a seal sized to sealingly engage the seat of the first socket and the sensor body.

14. The manifold assembly of claim 12, in which the manifold further comprises a first secondary conduit extending through the body and adapted to fluidly communicate with the secondary passage, and in which the second end of the first leakage conduit fluidly communicates with the first secondary conduit.

15. The manifold assembly of claim 12, in which the first socket further includes an inboard section having a first diameter sized to receive a forward end of the sensor, an outboard section having a second diameter larger than the first diameter, and a shoulder disposed between the inboard section and the outboard section, and in which the first end of the first leakage conduit extends through the shoulder.

16. The manifold assembly of claim 12, in which:
the sensor further comprises a sensor wire extending from a rearward end of the sensor; and
the first cap assembly comprises a cap having a first end directly coupled to the first socket and a second end, and a plug coupled to the cap second end and having a plug wall defining a wire aperture sized to sealingly engage the sensor wire.

17. The manifold assembly of claim 12, in which the manifold further includes:
- a second socket formed in the body and having an outboard aperture adjacent the sidewall and an inboard aperture fluidly communicating with the primary conduit, the second socket defining an intermediate chamber disposed between the outboard aperture and the inboard aperture and a seat disposed between the inboard aperture and the intermediate chamber; and
- a second leakage conduit formed in the body and having a first end fluidly communicating with the intermediate chamber of the second socket and a second end adapted to fluidly communicate with the secondary passage.

18. The manifold assembly of claim 17, further comprising:
- a second sensor disposed in the second socket and having a sensor body engaging the seat of the second socket; and
- a second cap assembly coupled to the second socket and extending over at least a portion of the outboard aperture of the second socket.

19. The manifold assembly of claim 18, further comprising a second secondary conduit extending through the body and adapted to fluidly communicate with the secondary passage, in which the second end of the second leakage conduit fluidly communicates with the second secondary conduit.

* * * * *